Patented July 10, 1951

2,560,492

UNITED STATES PATENT OFFICE 2,560,492

COPOLYMERS OF SUBSTITUTED STYRENES AND POLYOLEFINS

William J. Sparks, Cranford, and David W. Young, Roselle, N. J., assignors to Standard Oil Development Company, a corporation of Delaware No Drawing. Application February 8, 1945, Serial No. 576,894

7 Claims. (Cl. 260—83.7)

This invention relates to a novel chemical process and to the resulting products and uses thereof, and more particularly relates to the preparation of high molecular weight organic compounds by a novel type of copolymerization at low temperature.

Broadly, the invention comprises copolymerizing a substituted styrene with a polyolefin at a temperature below about 0° C. in the presence of an active inorganic halide catalyst.

The substituted styrene used should be a polymerizable compound having the general formula $C_6(R')_5C(R)=CH_2$, where R is hydrogen or hydrocarbon, preferably having less than 10 carbon atoms, such as methyl, ethyl, phenyl or equivalent group, and R' is either one of the groups such as those listed under R', or else a halogen such as chlorine, bromine, fluorine or iodine, and the various substituents R' may be like or unlike and may be in various positions para, ortho and meta in respect to the ethylene group of the substituted styrene molecule, it being essential for the invention that either R or at least one of the groups R' be a substituent, i. e., a radical other than hydrogen. Examples of suitable substituted styrenes coming within the scope of this invention include alpha methyl styrene, p-methyl styrene, alpha methyl p-methyl styrene, p-brom styrene, p-chlor styrene, p-fluor styrene, alpha methyl p-chlor styrene, m-chlor styrene, o-fluor styrene, m-fluor styrene, 3,4-dichlorstyrene, 2,5-dichlorstyrene.

The polyolefin to be used may be selected from any of the known polyolefins, including diolefins, triolefins or higher polyolefins. A number of suitable ones include:

Butadine
2-methylbutadiene-1-3 (isoprene)
4-methylbutadiene-1-3 (piperylene)
Heptadiene-1-3
2,3-dimethylbutadiene-1-3
1,4-dimethylbutadiene-1-3
Heptadiene-2-4
Cyclopentadiene
Cyclohexadiene
Myrcene
2-methylpentadiene-1-5
2-methyl-3 butyl butadiene-1-3
2-3-diethylbutadiene-1-3
Allo-ocimene In the accompanying claims the word polyolefin is intended to mean monomeric compounds such as those listed above containing 2 or 3 olefin linkages.

The proportions in which these two reactants were mixed together for the co-reaction of copolymerization may vary over a fairly wide range depending upon the particular type of reactants used and the type of finished product desired, but ordinarily the amount of the substituted styrene used should be about 5% to 80% by weight, preferably about 5% to 60% by weight of the mixed reactants and the amount of polyolefin therefore will be about 20% to 95% by weight, preferably about 40% to 95% by weight.

In order to effect the copolymerization, a Friedel-Crafts catalyst is used, including not only the Friedel-Crafts metal halides per se, but also complexes thereof with various other materials such as acid chlorides, aromatic ether, acids, etc. Some of the active catalysts are listed herewith:

$AlCl_3$
$AlBr_3$
$AlBr_2Cl$
$AlCl_2Br$
$Al_2Br_5Cl$
$BF_3$
$BF_3$.ether complex
$BF_3$.isopropyl alcohol complex
$TiCl_4$
$TiCl_4.AlO(OC_2H_5)$
$AlCl_3.Al(OC_2H_5)_3$ Some of these catalysts such as $AlCl_3$ are advantageously used in the form of a solution thereof in a solvent such as a lower alkyl halide, e. g. methyl chloride, ethyl chloride and the like, this solution being made by dissolving the aluminum chloride in the solvent at the boiling point of the solvent, or at room temperature, or at even slightly elevated temperature, and then cooling the resulting solution down to a temperature at or near that to be used for the copolymerization. Other catalysts such as $AlBr_3$ may be used in hydrocarbon solvent such as propane, butane, isobutane, pentane, etc. $BF_3$ which is a gas, may be used either in the gaseous state by bubbling it through the reaction liquid or may be used as a solution which may be made by bubbling it into a suitable solvent such as methyl chloride or ethyl chloride and then cooling the solution.

In carrying out the copolymerization, the reactants may be treated directly along with the catalyst, but preferably an inert solvent is also used, such as propane, butane, ethane, ethylene, or lower alkyl halides such as methyl chloride, ethyl chloride, etc. The temperature to be used for carrying out the copolymerization should be from about 0° C. to —150° C. or so, these lower temperatures being conveniently obtained by the use of a liquid as internal refrigerant which boils or vaporizes at the desired low temperature, as for instance, methyl chloride which boils at about −23° C., solid carbon dioxide which sublimes at about −78° C., and ethylene which boils at about −103° C.

In carrying out the copolymerization reaction, various procedures may be used, for instance, one of the simplest methods is to mix the two reactants and inert solvent together and then add the catalyst with agitation.

After the copolymerization reaction has been completed, and is generally rapid, requiring only a few minutes, residual catalyst is hydrolyzed and removed by adding to the reaction mixture a substantial amount such as about 2 to 10 volumes per 100 volumes of reaction liquid, of a lower alcohol such as ethyl, isopropyl or methyl alcohol, or water or mixtures thereof alone or also containing an alkaline material such as caustic soda, after which the product is then washed one or more times with water and completely separated from hydrolyzed catalyst, and from the solvent used during the reaction.

If desired, the product may be then heated, preferably milling or kneading in order to drive off residual traces of moisture or solvent. In case the process is operated under conditions that the resulting copolymer remains soluble in the solvent, the resulting polymer-solvent solution is separated from the aqueous or alcoholic catalyst sludge layer, and then the solvent may be driven off from the polymer by distillation or vacuum drying.

The product made according to this invention is a high molecular weight synthetic plastic having properties quite distinct from products made by the use of unsubstituted styrene in place of substituted styrene. One very great superiority of the present products consists in their higher heat softening points. For instance, the copolymer made at −103° C. to −78° C. from equal parts of alpha methyl styrene and isoprene has a substantially higher heat softening point than a similar copolymer of plain styrene and isoprene. The products of this invention normally have an average molecular weight of at least about 2,000, and preferably at least about 30,000 to ∞ (an infinitely high mol. wt.), due to cross linking. They generally are hard resinous thermo-plastic materials which are well adapted for formation of molded or extruded articles, and they may be put into thin sheets or films and are useful as a thermo-plastic bonding agent or adhesive for preparation of laminated sheet materials such as plywood, or products composed of a plurality of layers of paper, cloth, wood, regenerated cellulose, cellulose acetate, clear vinyl polymers, etc.

These products also have excellent electrical insulating characteristics and may be used in various ways such as extruded tubing immediately around a copper wire or cable, having if desired, a further outer coating of more elastic or resilient nature such as rubber or synthetic rubber, or it may be used as dielectric material between the sheets of aluminum foil for equivalent materials in making fixed electrical condensers. It may also be used for making molded electrical insulators for high voltage electrical equipment.

The products of this invention may have a greater or lesser degree of chemical unsaturation depending upon the proportion of polyolefin used and the conditions of copolymerization, but normally, they will have an iodine number of about 1 to 300, and preferably about 3 to 100.

This unsaturation may be used advantageously in various ways, as for instance in preparing coating compositions such as paints, varnishes, lacquer, etc., where it is desired to have a slight unsaturation so that the coating film will upon oxidation with age become slightly harder, tougher and more weather resistant. This unsaturation also permits vulcanization by compounding with sulfur or a sulfur-yielding agent, preferably also with a suitable accelerator, and subsequently heating the mixture until the desired vulcanization or curing has taken place.

Suitable sulfur-yielding substances include: sulfur halides e. g. sulfur monochloride, or dichloride, mercapto benzothiazole, etc.

Suitable accelerators or curing aids include: Tuads (tetramethyl thiuram disulfide), para quinone dioxime or its esters, analogues, and homologues, dinitroso compounds, diphenyl guanidine; these latter compounds being used either in the presence or absence of sulfur as desired.

The copolymers of this invention, either when intended to be used in an unvulcanized or in a vulcanized condition, may be compounded with other materials such as mineral fillers including zinc oxide, carbon black, clay, zinc stearate, etc. or plasticizing material such as paraffin wax, petrolatum, various synthetic waxes, heavy mineral oils, bituminous substances including asphalt, cracking coil tar, etc., fatty oils, polyesters, or other high molecular weight plastics which may have various modifying characteristics such as particularly aliphatic hydrocarbon materials such as high molecular weight olefin polymers e. g. polyisobutylene, polyethylene, or other polymers and copolymers such as polystyrene, styrene-isobutylene copolymers, copolymers of styrene with various diolefins such as isoprene, methyl pentadiene, etc., natural rubber or various synthetic rubbers e. g., vulcanizable copolymers of isobutylene with a small amount of isoprene or butadiene and having low unsaturation, more highly unsaturated copolymers e. g., emulsion copolymers of 75% butadiene with 25% of either styrene or acrylo nitrile.

Also, if desired, one may add to these various compositions oxidation inhibitors or other stabilizers, such as di-ortho-tertiary butyl derivative of paracresol.

The invention will be better understood from a consideration of the following specific examples:

Example 1

50 g. of methyl styrene was placed in 200 g. of methyl chloride. To this solution was added 50 g. of isoprene. After this about 300 g. of powdered Dry Ice ($CO_2$) was added. The reaction vessel was a 1.0 l. Dewar flask. To this mixture was added 50 grams of catalyst solution at −25° C. The concentration of $AlCl_3$ in the $CH_3Cl$ catalyst solution was 0.98 g./100 ml. Time of reaction was 15 minutes. Product became insoluble in the $CH_3Cl$ at −78° C. Product was removed, washed with hot water (about 500 grams water) and then dried. A high molecular weight insoluble resin resulted. The polymer was not soluble in mineral oils. However, tests indicated that wax could be added on a hot mill, to a concentration of about 10%, to the copolymer.

Example 2

500 g. of alpha methyl styrene was placed in 1 l. of $CH_3Cl$. To this mixture was added 500 g.

of c. p. isoprene. The active feed was held in a copper reactor, placed in a Dewar flask. Ethylene was used to cool the copper reactor. When the feed was at a temperature of −103° C., catalyst was added. That catalyst was 0.8 g./100 ml. of $AlCl_3$ in $CH_3Cl$. Volume of catalyst used was 500 grams. Polymer formed as the catalyst was added. The copolymer, which had an aver. mol. wt. of about ∞ due to a cross-linking gel structure, was not soluble in the feed. After washing, the yield of product was 86%. The polymer did not become plastic on a mill until the temperature was about 200° F. The resin was found to be slightly compatible with 260,000 M. W. (Staudinger) polybutene, e. g. in concentrations up to about 50% of the latter, which additive has a substantial plasticizing effect without impairing the electrical insulating and other valuable properties of the copolymer.

*Example 3*

150 ml. of alpha methyl styrene was added to 500 ml. of 2-methylpentadiene. To this diene mixture was added 500 ml. of methyl chloride and an excess of powdered Dry Ice ($CO_2$). The mixture was held in a 2 l. Dewar flask. To this mixture at −78° C. was added 250 ml. of 0.9 g./100 ml. of $AlCl_3$ per 100 ml. $CH_3Cl$. After 10 minutes the reaction was killed with 50 ml. of isopropyl alcohol. The polymer was insoluble in the feed. Product was removed, washed with water and alcohol and then dried, yield 84% and mol. wt. about ∞. The copolymer was not soluble in low V. I. (viscosity index) mineral oil, whereas styrene-methyl pentadiene copolymers and polymethylpentadiene are soluble in oils generally, and polyalpha methylstyrene and polystyrene are soluble at 100° F. or higher in mineral oils having a viscosity index below −50.

*Example 4*

Equal parts by weight of alphamethyl paramethyl styrene and isoprene were copolymerized at −75° C. with a catalyst consisting of aluminum chloride dissolved in methyl chloride.

The resulting copolymer which was a resin having an average molecular weight of about ∞ and a heat softening point of about 175° C., and good electrical insulating properties was compounded with rubber and polybutene and vulcanized to make an electric cable insulation stock of increased modulus and good ozone resistance. The following materials were used in compounding this stock:

| Ingredients | Parts by weight |
|---|---|
| Polybutene (100,000 mol. wt. by Staudinger method) | 550 |
| Rubber (smoked sheet) | 450 |
| Copolymer (made as described above) | 90 |
| Sulfur | 9 |
| Cap tax (mercapto benzo thiazole) | 4.5 |
| D. P. G. (Diphenyl guanidine) | 0.45 |
| Stearic acid | 4.5 |
| Zinc oxide | 22.5 |
| Parafforce (clay) | 900 |
| Gastex (carbon black) | 100 |

The above ingredients were compounded on a rubber mill at a temperature of about 125° F.–300° F. till homogeneous and then the stock was cured for various lengths of time ranging from 30 to 90 minutes and tested with the following results:

| Minutes Cure at 275° F | 30 | 45 | 60 | 90 |
|---|---|---|---|---|
| Tensile, lbs./sq. inch | 950 | 843 | 960 | 913 |
| Percent Permanent Set | 84 | 84 | 84 | 85 |
| Percent Elongation at Break | 500 | 530 | 500 | 550 |
| Modulus at 200% Elong | 405 | 364 | 380 | 358 |
| Percent Cure Rating | 100 | 100 | 100 | 100 |
| Shore Hardness | 60 | 60 | 60 | 59 |

This stock showed good ozone resistance after a three hour test (0.012% ozone), whereas a similarly compounded and cured stock without the alpha methyl para methyl styrene-isoprene copolymer would normally result in about 0.008% ozone in the same test. When tested in the Geer oven for seven days, at 158° F., this cured stock showed 79.5% tensile strength retained and 92% elongation retained, whereas corresponding figures for a similar stock without the copolymer would be about 87% tensile retained and about 85% elongation retained. These data show that the copolymer has excellent physical and electrical properties for making compounded cable insulation.

*Example 5*

125 ml. of p.-chlor styrene were added to 500 ml. of methyl chloride in a 2 l. Dewar flask, and to this solution was added 125 ml. of c. p. isoprene. This solution was then agitated and 110 ml. of a catalyst solution consisting of 0.93 gms. of $AlCl_3$ per 100 ml. of $CH_3Cl$ were added with continued agitation. The copolymer was soluble in the $CH_3Cl$ until all of the catalyst had been added, and then it became insoluble in the $CH_3Cl$. The reaction was stopped by the use of 50 ml. of isopropyl alcohol. The copolymer was then removed from the $CH_3Cl$-alcohol mixture and then washed with 200 ml. of isopropyl alcohol. The copolymer became dispersed in the alcohol, and was removed by filtration through paper, after which it was placed in a Pyrex beaker at 125° C. for one half hour to remove the alcohol. The yield of copolymer was 96%. It showed the following chemical analysis: 71.82% carbon, 7.59% hydrogen, and 17.50% chlorine. The balance of about 3% is essentially absorbed oxygen which has combined into the copolymer at the unsaturated linkages. This resinous copolymer was insoluble in methyl ethyl ketone at room temperature, but was soluble in high molecular weight polybutene and polyethylene in concentrations up to about 50% by weight of the resin.

*Example 6*

Equal parts by weight of pure para chlor styrene and pure 2-methyl pentadiene were diluted with two volumes of methyl chloride per volume of said mixed reactants and copolymerized at a temperature of −103° C. using an $AlCl_3$-$CH_3Cl$ solution as a catalyst. A 72% yield of copolymer was obtained which showed an average molecular weight of about 26,000, a tensile strength of about 720 lbs./sq. inch and an elongation of 475% (to break). 50 parts by weight of this copolymer were compounded on a rubber mill at 240° F. for 10 minutes with 25 parts by weight of an emulsion copolymer of 70% by weight of styrene and 30% by weight of isoprene made at an elevated temperature of about 125° F. Good compatibility was obtained and this mixture had a tensile strength of 1400 lbs./sq. inch and an elongation of 410%, at 25° C. This copolymer of para chlor styrene and 2-methyl pentadiene was hot milled in equal proportions with a solid polyethylene plastic having a molecular weight of about 30,000, and the resulting mixture was found to be homogeneous and compatible. The copolymer is also soluble in low V. I. mineral oils and is compatible with polybutene and with synthetic rubbers such as an emulsion copolymer of 75% butadiene and 25% styrene.

*Example 7*

75 parts by weight of alpha methyl styrene were copolymerized with 25 parts by weight of butadiene at a temperature of about −78° C. using as catalyst an $AlCl_3$-$CH_3Cl$ solution, and using 2 volumes of methyl chloride as solvent per volume of mixed reactants, with the resulting formation of a hard resinous copolymer having a molecular weight of about ∞ and a heat softening point of about 180° C. This product was compatible in polybutene (250,000 mol. wt., Staudinger) to make a composition particularly useful for electrical insulation, filming into sheets, etc. The copolymer per se is suitable for use as adhesive, for making laminated products, as a resin for making coating compositions, etc.

Although most of the low-temperature copolymers made according to this invention as described above are hard resinous thermo-plastic solids, which are substantially different from, and have much better moulding characteristics than, copolymers made by emulsion method or mass polymerization at elevated temperatures from the same raw materials, it is also possible within the scope of the invention to obtain some slightly rubbery plastics by using polyolefins having more than 6 carbon atoms and maintaining the proportion of substituted styrene at less than 50% by weight of the total mixture of reactants, and using a copolymerization temperature below −25° C.

As a further modification of the invention, the various novel copolymers described above may be subjected to various processes for converting them into corresponding chemical derivatives, such as by chlorination or other halogenation, oxidation, nitration, sulfurizing, sulfonation, hydrogenation, treatment with a phosphorous sulfide, e. g. $P_2S_5$ etc. It is not intended that this invention be limited to the specific examples which have been given merely for the sake of illustration, but only by the appended claims in which it is intended to claim all novelty inherent in the invention as well as all modifications coming within the scope and spirit of the invention.

What is claimed is:

1. The process which consists essentially in copolymerizing 5 to 80% by weight of a substituted styrene containing 1 to 2 alkyl substituents of 1 to 2 carbon atoms each, and 20 to 95% by weight of a polyolefin of 4 to 10 carbon atoms, at a temperature of 0° C. to −103° C., in the presence of a Friedel-Crafts catalyst.

2. Process according to claim 1 in which the substituted styrene is an alpha methyl styrene.

3. The process which consists in copolymerizing 5 to 80% by weight of alphamethyl styrene and 20 to 95% by weight of a 2-methyl diolefin-1,3 having a total of 5 to 6 carbon atoms, at a temperature of −78° C. to −103° C., in the presence of a Friedel-Crafts catalyst.

4. The process which consists in copolymerizing 5 to 80% by weight of alphamethyl styrene and 20 to 95% by weight of 2-methyl pentadiene-1,3 at a temperature of −78° C. to −103° C. in the presence of a catalyst consisting of aluminum chloride dissolved in methyl chloride.

5. The process which consists essentially in copolymerizing about 50 to 75% by weight of a substituted styrene selected from the group consisting of alphamethyl styrene and alphamethyl paramethyl styrene, with about 50 to 25% by weight of a diolefin selected from the group consisting of butadiene, isoprene and 2-methyl pentadiene, at a temperature of about −78° C. to −103° C., in the presence of methyl chloride as diluent, and in the presence of a catalyst consisting of aluminum chloride dissolved in methyl chloride.

6. Process according to claim 1 in which the polyolefin has more than 6 carbon atoms.

7. The process which comprises copolymerizing equal parts by weight of alphamethyl styrene and isoprene in the presence of methyl chloride as solvent, at a temperature of about −103° C., using as catalyst a solution of aluminum chloride in methyl chloride.

WILLIAM J. SPARKS.
DAVID W. YOUNG.

REFERENCES CITED

The following references are of record in the file of this patent:

UNITED STATES PATENTS

| Number | Name | Date |
|---|---|---|
| 2,276,893 | Thomas | Mar. 17, 1942 |
| 2,338,742 | Soday | Jan. 11, 1944 |
| 2,366,219 | Soday | Jan. 2, 1945 |
| 2,439,610 | Morris et al. | Apr. 13, 1948 |
| 2,471,234 | Morris et al. | May 24, 1949 |

FOREIGN PATENTS

| Number | Country | Date |
|---|---|---|
| 106,371 | Australia | Jan. 26, 1939 |
| 115,688 | Australia | Aug. 20, 1942 |
| 345,939 | Great Britain | Mar. 16, 1931 |
| 588,785 | Germany | July 21, 1939 |